United States Patent
Nakagawa et al.

(10) Patent No.: US 12,043,318 B2
(45) Date of Patent: Jul. 23, 2024

(54) VEHICLE BODY STRUCTURE

(71) Applicants: SUBARU CORPORATION, Tokyo (JP); TOYOTA JIDOSHA KABUSHIKI KAISHA, Toyota (JP)

(72) Inventors: Shuichi Nakagawa, Tokyo (JP); Keisuke Yokota, Tokyo (JP); Tsukasa Hoshino, Tokyo (JP)

(73) Assignees: SUBARU CORPORATION, Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 359 days.

(21) Appl. No.: 17/674,241

(22) Filed: Feb. 17, 2022

(65) Prior Publication Data
US 2022/0314359 A1  Oct. 6, 2022

(30) Foreign Application Priority Data
Mar. 31, 2021 (JP) ................ 2021-062028

(51) Int. Cl.
| | |
|---|---|
| *B62D 27/02* | (2006.01) |
| *B23K 11/20* | (2006.01) |
| *B23K 20/12* | (2006.01) |
| *B23K 20/24* | (2006.01) |
| *B23K 28/02* | (2014.01) |

(Continued)

(52) U.S. Cl.
CPC ............ *B62D 27/023* (2013.01); *B23K 11/20* (2013.01); *B23K 20/12* (2013.01); *B23K 20/24* (2013.01); *B23K 28/02* (2013.01); *B62D 25/06* (2013.01); *B62D 27/00* (2013.01); *B62D 27/02* (2013.01); *B62D 27/04* (2013.01); *B62D 29/008* (2013.01); *B23K 11/11* (2013.01)

(58) Field of Classification Search
CPC ...... B62D 25/06; B62D 27/02; B62D 27/023; B62D 27/00; B62D 27/04; B62D 29/008; B23K 11/20; B23K 11/11; B23K 11/0026; B23K 2101/006; B23K 2103/20
USPC ..................................... 296/29, 210
See application file for complete search history.

(56) References Cited

U.S. PATENT DOCUMENTS

| | | | | |
|---|---|---|---|---|
| 7,997,643 B2 * | 8/2011 | Shah | ..................... | B62D 25/06 296/210 |
| 8,424,961 B2 * | 4/2013 | Carsley | ................. | B62D 27/02 296/210 |

(Continued)

FOREIGN PATENT DOCUMENTS

JP  2008-030100 A  2/2008

*Primary Examiner* — Dennis H Pedder
(74) *Attorney, Agent, or Firm* — MCGINN I.P. LAW GROUP, PLLC (57) ABSTRACT

In a vehicle body structure, an end portion of a first vehicle body member having a plate shape is coupled to a second vehicle body member having a plate shape. The first vehicle body member is made of a first metal and the second vehicle body member is made of a second metal. The vehicle body structure includes a third vehicle body member made of the first metal. The third vehicle body member includes an interposed portion having general portions and a convex portion. The convex portion has a weld-joint portion configured to be joined to the end portion of the first vehicle body member by welding. Each of the general portion has a swage-joint portion configured to be swaged and jointed to the second vehicle body member in a circular shape viewed from a thickness direction, and a cutout portion.

8 Claims, 8 Drawing Sheets

(51) Int. Cl.
*B62D 25/06* (2006.01)
*B62D 27/00* (2006.01)
*B62D 27/04* (2006.01)
*B62D 29/00* (2006.01)
B23K 11/11 (2006.01)

(56) References Cited

U.S. PATENT DOCUMENTS

| | | | | |
|---|---|---|---|---|
| 8,820,824 | B1* | 9/2014 | Hinz | B62D 29/008 |
| | | | | 296/210 |
| 9,114,836 | B1* | 8/2015 | Hinz | B62D 29/008 |
| 9,227,668 | B2* | 1/2016 | Kimura | B32B 15/012 |
| 10,150,513 | B2* | 12/2018 | Hinz | B60R 9/04 |
| 11,077,886 | B2* | 8/2021 | Kagami | B62D 27/023 |
| 2015/0217812 | A1* | 8/2015 | Hinz | B62D 25/06 |
| | | | | 296/210 |
| 2015/0375795 | A1* | 12/2015 | Freis | B21J 15/025 |
| | | | | 29/897.2 |

* cited by examiner

VEHICLE BODY STRUCTURE

CROSS-REFERENCE TO RELATED APPLICATIONS

This application is based on and claims priority under 35 USC 119 from Japanese Patent Application No. 2021-062028 filed on Mar. 31, 2021, the contents of which are incorporated herein by reference.

The present disclosure relates to a vehicle body structure in which vehicle body members made of different kinds of metals are joined to each other.

For a purpose of improving a motion performance of a vehicle, a frame member of a vehicle body may be made of steel, and an outer panel member of the vehicle body may be made of aluminum as disclosed, for example, in Japanese Patent Application Publication (JP-A) No. 2008-030100. JP-A No. 2008-030100 discloses a technique of joining a roof panel made of aluminum to a side member made of steel. In the vehicle body structure described in JP-A No. 2008-030100, a cutout portion is formed in a flange portion of the roof panel, a joint member made of steel is joined to the roof panel by friction stir welding so as to be exposed from the cutout portion, and an exposed portion of the joint member from the cutout portion is joined to the side member by spot welding.

SUMMARY

An aspect of the disclosure provides a vehicle body structure. In the vehicle body structure, an end portion in a predetermined direction of a first vehicle body member having a plate shape is coupled to a second vehicle body member having a plate shape. The first vehicle body member is made of a first metal and the second vehicle body member is made of a second metal different from the first metal. The vehicle body structure includes a third vehicle body member having a plate shape and made of the first metal. The third vehicle body member includes an interposed portion configured to be interposed in a joint portion between the first vehicle body member and the second vehicle body member. The interposed portion is configured to extend along the end portion of the first vehicle body member. The interposed portion has general portions and a convex portion. Each of the general portions form an end of the third vehicle body member in the predetermined direction and is located close to the second vehicle body member in a thickness direction on an end side in the predetermined direction. The convex portion is adjacent to one of the general portions in an extending direction of the third vehicle body member and is located close to the first vehicle body member in the thickness direction. The convex portion has a weld-joint portion configured to be joined to the end portion of the first vehicle body member by welding. The each of the general portions has a swage-joint portion and a cutout portion. The swage-joint portion is configured to be joined to the second vehicle body member. The cutout portion is located on an opposite side of the weld-joint portion with respect to the swage-joint portion. The swage-joint portion is configured to be swaged and jointed to the second vehicle body member in a circular shape viewed from the thickness direction by overlapping the second vehicle body member with the third vehicle body member and then protruding the second vehicle member and the third vehicle member in the thickness direction.

BRIEF DESCRIPTION OF DRAWINGS

The accompanying drawings are included to provide a further understanding of the disclosure and are incorporated in and constitute a part of this specification. The drawings illustrate an embodiment and, together with the specification, serve to explain the principles of the disclosure.

DESCRIPTION OF EMBODIMENTS

In the vehicle body structure described in JP-A No. 2008-030100, since the roof panel and the joint member are firmly joined to each other by friction stir joining, when the roof panel is exposed to a high temperature in a coating process or the like of the vehicle body, relative movement between the roof panel and the joint member is not allowed, and internal stress of the roof panel caused by a difference in thermal expansion coefficient increases, and the roof panel may be deformed.

The present disclosure relates to a vehicle body structure capable of reducing internal stress caused by a difference in thermal expansion coefficient in vehicle body members when the vehicle body members made of different kinds of metals are joined to each other.

In the following, some embodiments of the disclosure are described in detail with reference to the accompanying drawings. Note that the following description is directed to illustrative examples of the disclosure and not to be construed as limiting to the disclosure.

Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
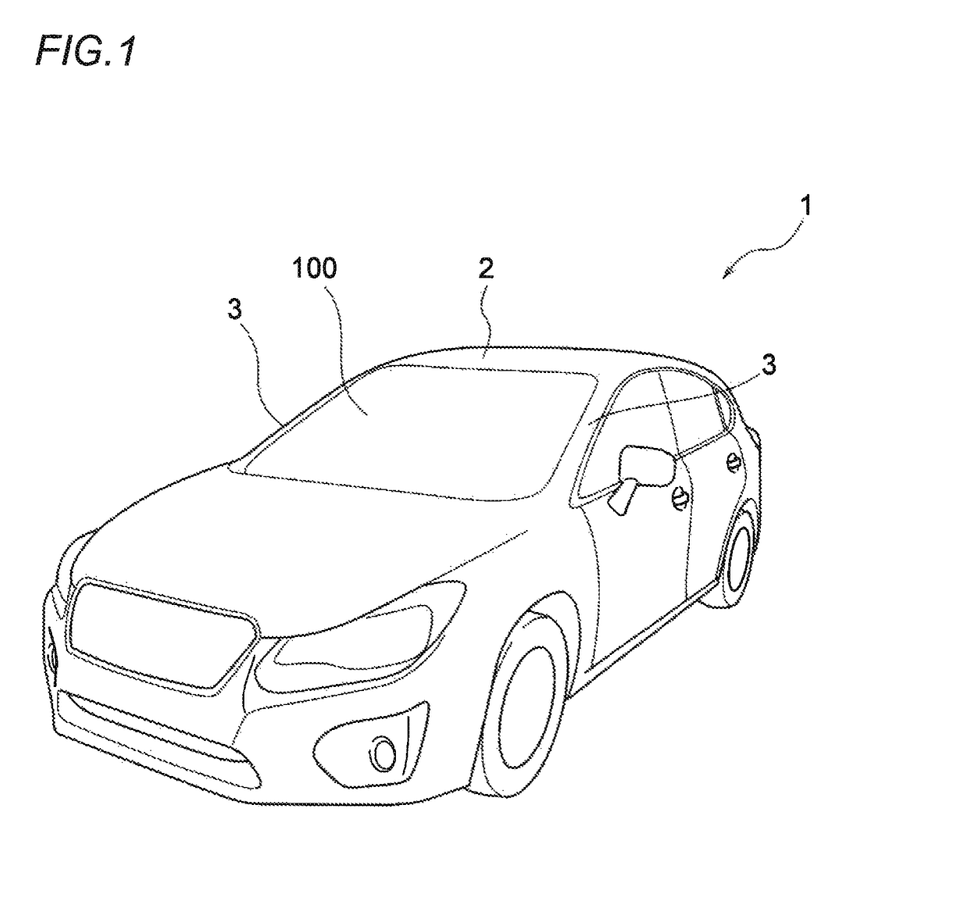
FIG. 1 is an external perspective view of a vehicle according to an embodiment.
Figure 2:
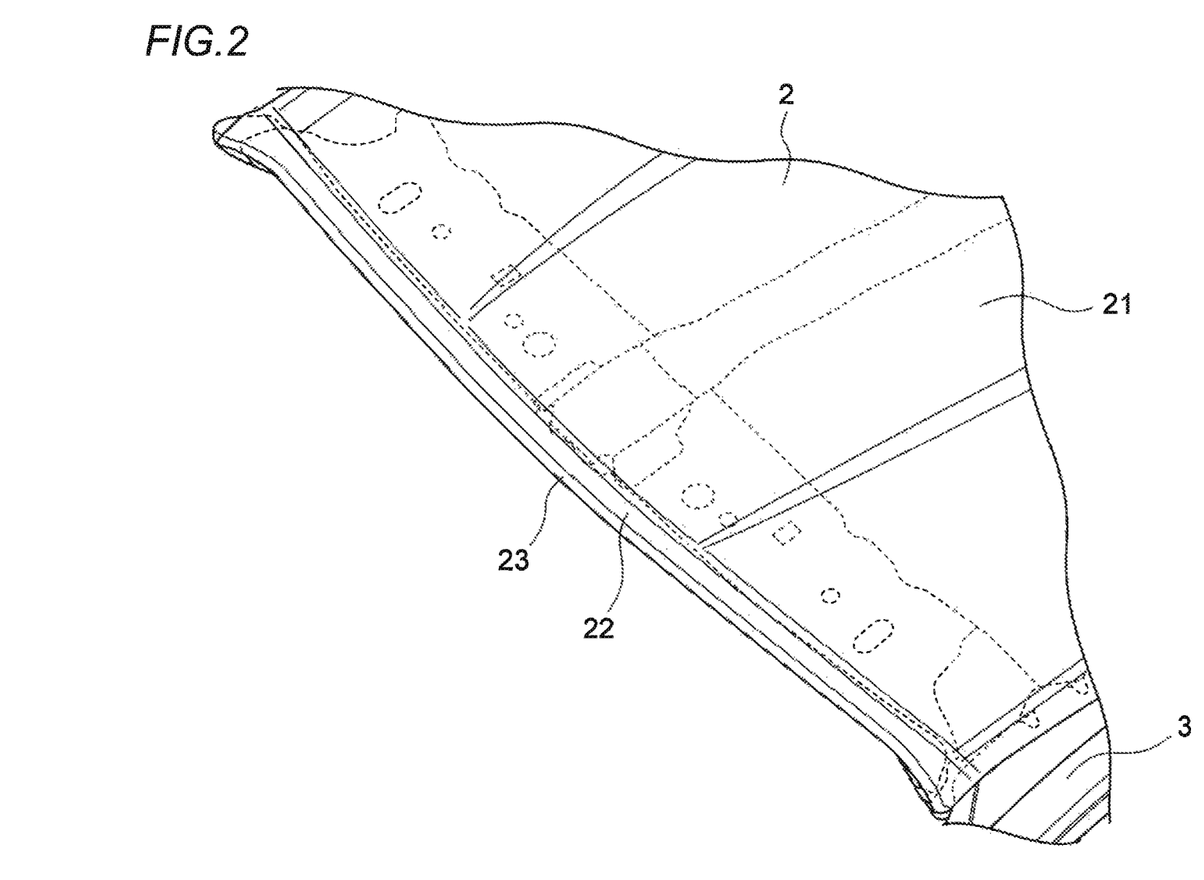
FIG. 2 is a schematic perspective view of a vehicle body upper structure.
Figure 3:
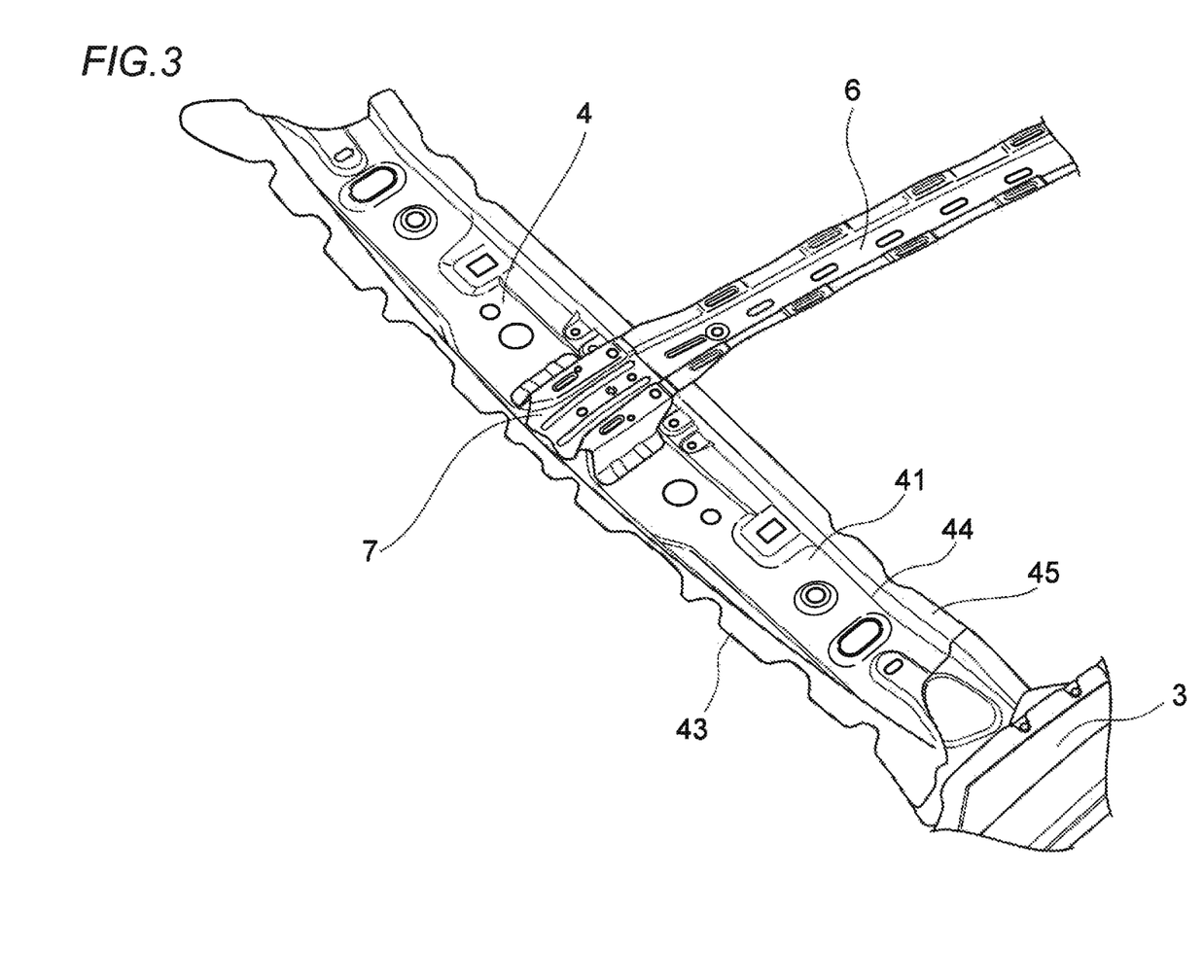
FIG. 3 is a schematic perspective view showing a state in which a roof panel and an end plate of the vehicle body upper structure are removed.
Figure 4:
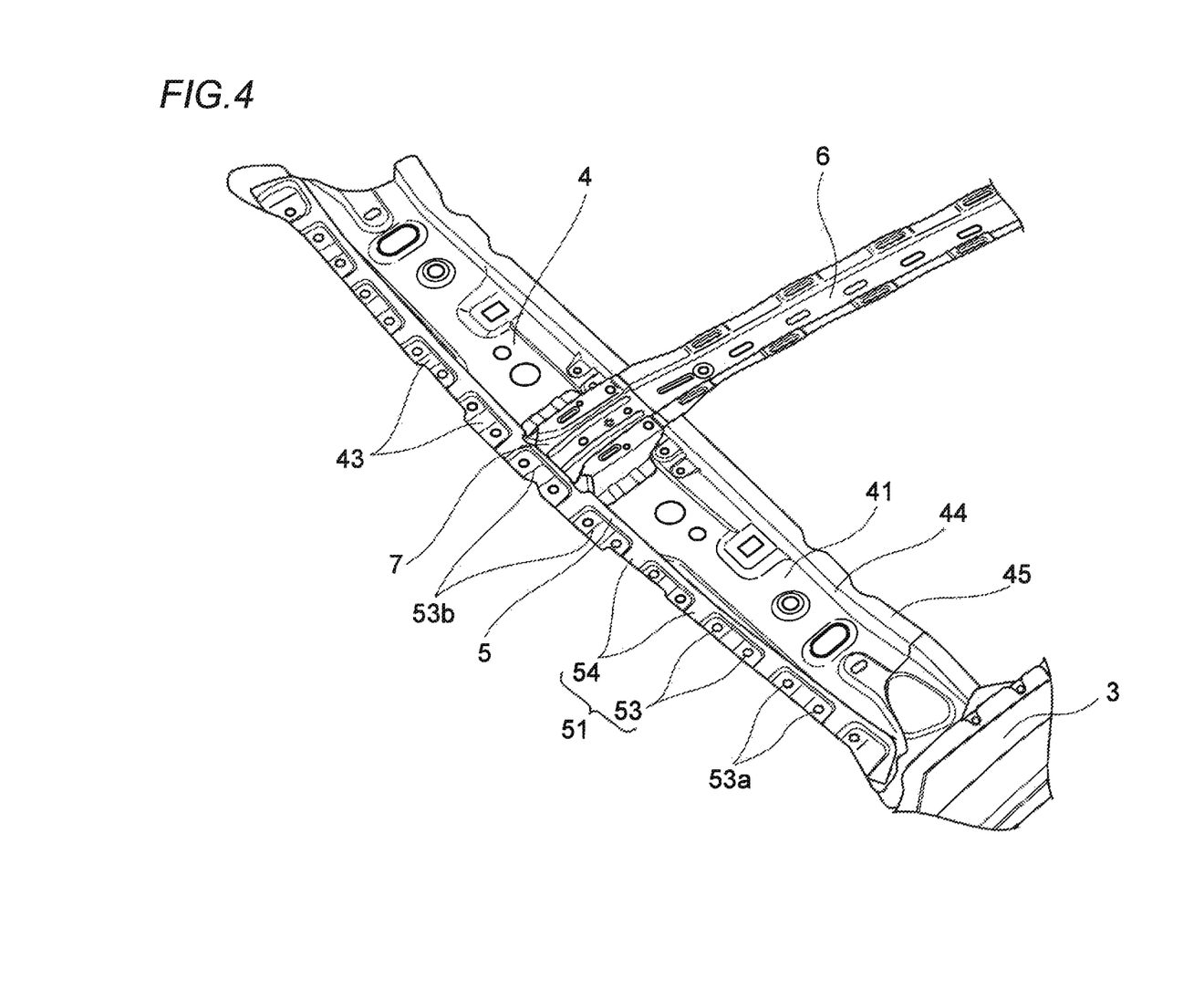
FIG. 4 is a schematic perspective view showing a state in which the roof panel of the vehicle body upper structure is removed.
Figure 5:
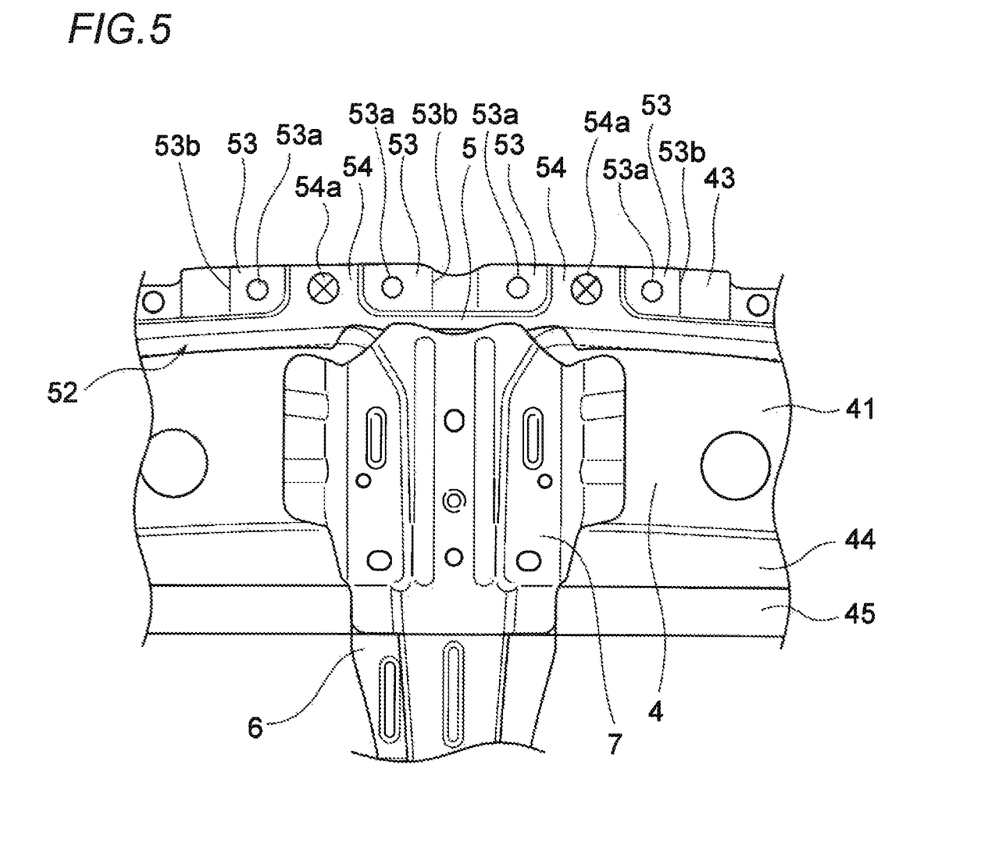
FIG. 5 is a schematic plan view showing a state in which the roof panel of the vehicle body upper structure is removed.
Figure 6:
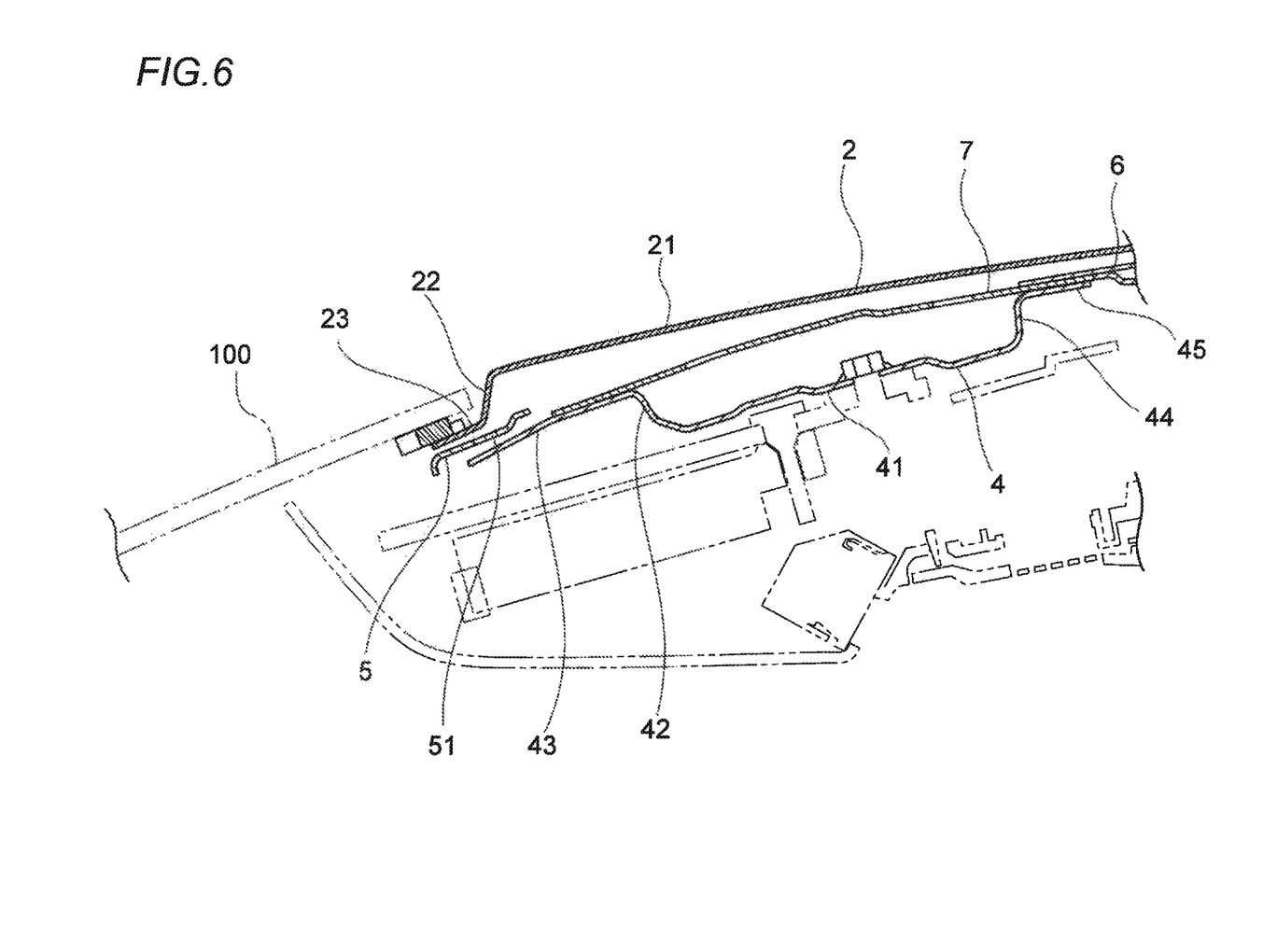
FIG. 6 is a schematic side sectional view of the vehicle body upper structure.
Figure 7:
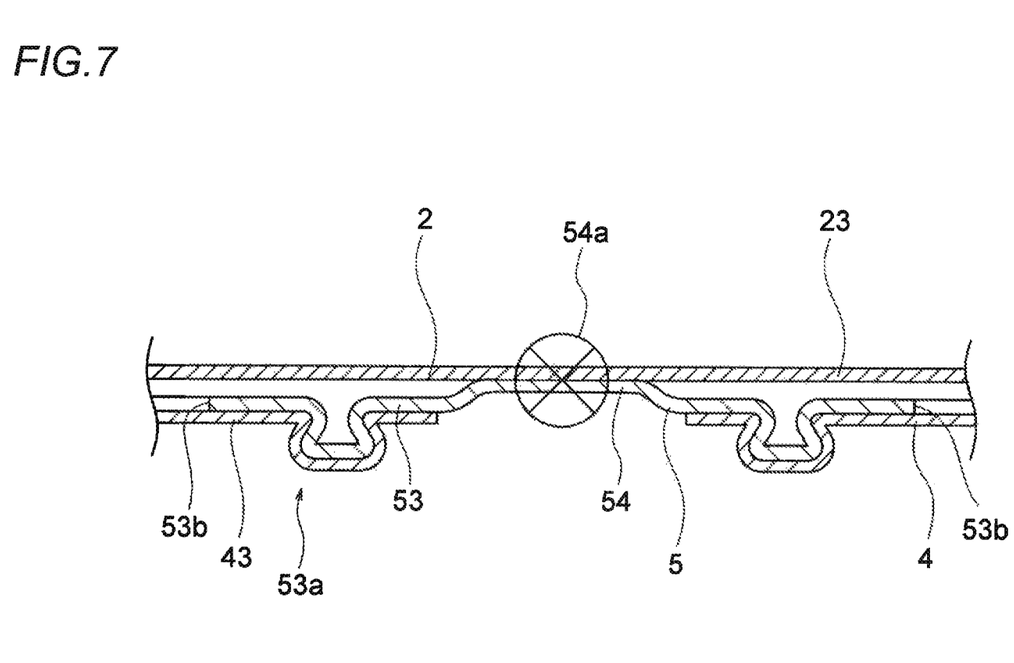
FIG. 7 is a schematic front sectional view of the vehicle body upper structure.
Figure 8:
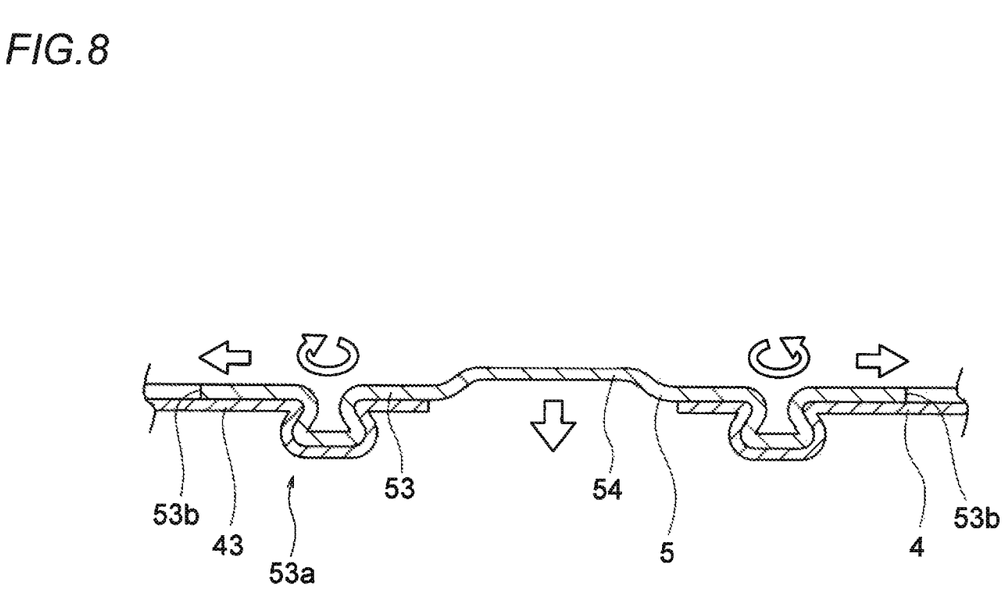
FIG. 8 is a schematic front sectional view of the vehicle body upper structure showing a behavior when exposed to a high temperature.

FIGS. 1 to 8 show an embodiment of the present disclosure. FIG. 1 is an external perspective view of a vehicle according to the embodiment, FIG. 2 is a schematic perspective view of a vehicle body upper structure, FIG. 3 is a schematic perspective view showing a state in which a roof panel and an end plate of the vehicle body upper structure are removed, FIG. 4 is a schematic perspective view showing a state in which the roof panel of the vehicle body upper structure is removed, FIG. 5 is a schematic plan view showing a state in which the roof panel of the vehicle body upper structure is removed, FIG. 6 is a schematic side sectional view of the vehicle body upper structure, Fla 7 is a schematic front sectional view of the vehicle body upper structure, and FIG. 8 is a schematic front sectional view of the vehicle body upper structure showing a behavior when exposed to a high temperature.

As shown in FIG. 1, a vehicle 1 includes a roof panel 2 that defines an upper portion of an indoor space. As shown in FIG. 2, the roof panel 2 forms an outer panel of the vehicle 1, and covers a rear end side of a windshield glass 100 from above at a front end side of the roof panel 2. In the embodiment, the roof panel 2 is made of plate-shaped aluminum as a first metal. The roof panel 2 includes a panel body portion 21 that forms a design surface, an inclined portion 22 that is inclined downward from a front end of the panel body portion 21 toward a front side, and a flange 23 that extends substantially forward from a front end of the inclined portion 22. In the embodiment, the flange 23 forms a front end portion of the roof panel 2.

As shown in FIG. 3, a vehicle body structure of the vehicle 1 includes a rail front 4 that connects upper ends of a pair of left and right front pillars 3 and extends in a left-right direction, and an end portion on a front end side of the roof panel 2 is fixed to an end portion on a front end side of the rail front 4. In the embodiment, each of the front pillars 3 and the rail front 4 serving as the frame members is made of plate-shaped steel serving as a second metal. The rail front 4 includes, in a side cross section, a bottom wall 41 extending substantially forward and rearward, a front wall 42 extending substantially upward from a front end of the bottom wall 41, a front flange 43 extending substantially forward from an upper end of the front wall 42, a rear wall 44 extending substantially upward from a rear end of the bottom wall 41, and a rear flange 45 extending substantially rearward from an upper end of the rear wall 44. In the embodiment, the front flange 43 forms a front end portion of the rail front 4.

As shown in FIG. 4, the vehicle body structure of the vehicle body 1 includes a plate-shaped end plate 5 made of aluminum and disposed between the roof panel 2 and the rail front 4. Further, the vehicle body structure of the vehicle 1 includes a brace 6 that is connected to a rear end of the rail front 4 and extends rearward, and a reinforcing member 7 that reinforces a connection portion between the rail front 4 and the brace 6. The end plate 5 has an interposed portion 51 that is interposed in a joint portion between the roof panel 2 and the rail front 4 and extends along the flanges 23 and 43, and a rear wall 52 that extends substantially downward from a rear end of the interposed portion 51.

The interposed portion 51 forms a front end of the end plate 5, and is disposed to overlap, in a plan view, with the flange 23 forming the front end of the roof panel 2 and the front flange 43 forming the front end of the rail front 4. As shown in FIG. 5, the rear wall 52 is formed along the front wall 42 of the rail front 4. As shown in FIG. 6, the brace 6 and the reinforcing member 7 are joined to a rear end side of the rail front 4.

As shown in FIG. 4, the interposed portion 51 of the end plate 5 has, on a front end side thereof, a general portion 53 located close to the front flange 43 of the rail front 4 in a thickness direction, and a convex portion 54 adjacent to the general portion 53 in an extending direction of the flanges 23 and 43, that is, in the left-right direction and located close to the flange 23 of the roof panel 2 in the thickness direction.

As shown in FIG. 5, the convex portion. 54 has a weld-joint portion 54a that is joined to the flange 23 of the roof panel 2 by welding.

In FIG. 5, the weld-joint portion 54a is indicated by a circle with a cross. The general portion 53 has a swage-joint portion 53a that is joined to the front flange 43 of the rail front 4 by swaging joint having a circular shape in a plan view in which the rail front 4 and the end plate 5 are projected in the thickness direction in an overlapped state. Further, the general portion 53 has a cutout portion 53b formed on an opposite side of the weld-joint portion 54a with respect to the swage joint portion 53a.

In the embodiment, as shown in FIG. 4, a plurality of convex portions 54 are formed at intervals in the left-right direction, and general portions 53 each having the swage-joint portion 53a and the cutout portion 53b are disposed on both left and right sides of each convex portion 54. A rear end of the interposed portion 51 is formed integrally with the convex portions 54 at the same height in the left-right direction. In the embodiment, as shown in FIG. 7, the flange 23 of the roof panel 2 and the convex portion 54 of the end plate 5 are joined to each other by spot welding. In FIG. 7, the weld-joint portion 54a formed by spot welding is indicated by a circle with a cross. As shown in FIG. 7, the front flange 43 of the rail front 4 and the general portion 53 of the end plate 5 are joined to each other by pressing a predetermined jig from an end plate 5 side toward a rail front 4 side in a state where the rail front 4 and the terminal plate 5 are overlapped with each other, and deforming both the rail front 4 and the terminal plate 5.

According to the vehicle body structure configured as described above, the flange 23 of the roof panel 2 is weld joined to the convex portion 54 of the interposed portion 51 of the end plate 5, and the general portion 53 of the interposed portion 51 of the end plate 5 is joined to the front flange 43 of the rail front 4 by swaging joint. Thus, the roof panel 2 is fixed to the rail front 4 via the end plate 5.

When a temperature of the vehicle body changes, since the end plate 5 made of aluminum and the rail front 4 made of steel have different thermal expansion coefficients, internal stress is generated in the terminal plate 5 and the rail front 4. At this time, since the end plate 5 and the rail front 4 are coupled to each other by swaging joint having a circular shape in a plan view, relative movement in a rotational direction with respect to a central axis of the swage-joint portion 53a is allowed. Further, since the swaging joint is loosened when the temperature of the vehicle body changes, the end plate 5 tends to move with respect to the rail front 4, and movement of the end plate 5 extending or contracting with respect to the rail front 4 is absorbed by the cutout portion 53b formed in the end plate 5. At this time, the general portion 53 of the interposed portion 51 of the end plate 5 extends or contracts in the extending direction, and the convex portion 54 moves in the thickness direction following the movement of the general portion 53 in the extending direction. In the embodiment, since the weld-joint portion 54a of the end plate 5 is disposed between the swage joint portions 53a and cutout portions 53b in the left-right direction, the end plate 5 can be deformed in a well-balanced manner.

For example, in a case where the roof panel 2 and the end plate 5 are exposed to a high temperature in a coating process of the vehicle body or the like, the roof panel 2 and the end plate 5, which are made of aluminum having a relatively large thermal expansion coefficient, extend in the extending direction further than the rail front 4 made of steel having a relatively small thermal expansion coefficient. At this time, as shown in FIG. 8, the end plate 5 is deformed such that each general portion 53 moves toward the cutout portion 53b in the left-right direction and the convex portion 54 is lowered in height with respect to each general portion 53.

As described above in detail, according to the vehicle body structure of the embodiment, when the roof panel 2 is joined to the rail front 4 made of a different kind of metal, the internal stress in the roof panel 2 caused by the difference in thermal expansion coefficient would be reduced. As a result, a metal different from the frame member of the vehicle body can be used for the outer panel in equipment for spot welding of the same kind of metal, and the degree of freedom in design of the vehicle is dramatically improved.

In the above embodiment, the present disclosure is applied to the joint portion between the roof panel and the rail front, but the present disclosure can also be applied to, for example, a joint portion between the outer panel and the inner panel such as a pillar, and can be applied to any portion where different kinds of metals are joined.

Further, in the embodiment described above, the swage-joint portion 53a and cutout portion 53b are disposed on both the left and right sides of the convex portion 54 having the weld-joint portion 54a, but the swage-joint portion 53a and cutout portion 53b may be disposed on at least one side.

Although the embodiment has been described above, the disclosures described in the claims are not limited to the embodiment described above. It should be noted that all combinations of the features described in the embodiment are not necessarily essential to the solution to problems of the disclosure.

According to the vehicle body structure of the present disclosure, the end portion of the first vehicle body member is joined to the convex portion of the interposed portion of the third vehicle body member by welding, and the general portion of the interposition portion of the third vehicle body member is joined to the second vehicle body member by swaging. Thus, the first vehicle body member is fixed to the second vehicle body member via the third vehicle body member.

When a temperature of the vehicle body changes, since the second vehicle body member made of the second metal and the third vehicle body member made of the first metal have different thermal expansion coefficients, relatively large internal stress is generated in the second vehicle body member and the third vehicle body member. At this time, since the second vehicle body member and the third vehicle body member are joined to each other by swaging joint having a circular shape in a plan view, relative movement in a rotational direction with respect to a central axis of the swage joint portion is allowed. Further, since the swaging joint is loosened when the temperature of the vehicle body changes, the third vehicle body member tends to move with respect to the second vehicle body member, and the movement of the third vehicle body member extending or contracting with respect to the second vehicle body member is absorbed by the cutout portion formed in the third vehicle body member. At this time, the general portion of the interposed portion of the third vehicle body member extends or contracts in the extending direction, and the convex portion moves in the thickness direction following the movement of the general portion in the extending direction.

In this way, when the temperature of the vehicle body changes, since the third vehicle body member mainly deforms, the relatively large internal stress is not generated in the first vehicle body member and the second vehicle body member that are to be joined.

According to the vehicle body structure of the present disclosure, since the weld joint portion between the first vehicle body member and the third vehicle body member is disposed between the swage-joint portion between the second vehicle body member and the third vehicle body member and the cutout portion of the third vehicle body member in the extending direction of the interposed portion of the third vehicle body member, the third vehicle body member would be deformed in a well-balanced manner.

According to the vehicle body structure of the present disclosure, the first vehicle body member made of aluminum is fixed to the second vehicle body member made of steel via the third vehicle body member made of aluminum.

According to the vehicle body structure of the present disclosure, since the roof panel is fixed to the frame member via the third vehicle body member and the third vehicle body member is deformed when the temperature of the vehicle body changes, relatively large internal stress is not generated in the roof panel forming the outer panel of the vehicle.

According to the vehicle body structure of the present disclosure, when the vehicle body members made of different kinds of metals are joined to each other, the internal stress caused by the difference in thermal expansion coefficient in the vehicle body member to be joined can be reduced.

What is claimed is:

1. A vehicle body structure in which an end portion in a predetermined direction of a first vehicle body member having a plate shape is coupled to a second vehicle body member having a plate shape, the first vehicle body member being made of a first metal and the second vehicle body member being made of a second metal different from the first metal, the vehicle body structure comprising:
   a third vehicle body member having a plate shape and made of the first metal, wherein
   the third vehicle body member includes an interposed portion configured to be interposed in a joint portion between the first vehicle body member and the second vehicle body member,
   the interposed portion is configured to extend along the end portion of the first vehicle body member,
   the interposed portion has general portions and a convex portion,
   each of the general portions forms an end of the third vehicle body member in the predetermined direction and is located close to the second vehicle body member in a thickness direction on an end side in the predetermined direction,
   the convex portion is adjacent to one of the general portions in an extending direction of the third vehicle body member and is located close to the first vehicle body member in the thickness direction,
   the convex portion has a weld-joint portion configured to be joined to the end portion of the first vehicle body member by welding,
   the each of the general portions has a swage-joint portion and a cutout portion, the swage-joint portion being configured to be joined to the second vehicle body member, the cutout portion being located on an opposite side of the weld-joint portion with respect to the swage-joint portion, and
   the swage-joint portion is configured to be swaged and jointed to the second vehicle body member in a circular shape viewed in the thickness direction by overlapping the second vehicle body member with the third vehicle body member and then protruding the second vehicle member and the third vehicle member in the thickness direction.

2. The vehicle body structure according to claim 1, wherein
some of the general portions of the third vehicle body member are formed respectively on both end sides of the convex portion so as to be adjacent to the convex portion in an extending direction of the interposed portion, and
the each of the some of the general portions adjacent to the convex portion has the swage-joint portion and the cutout portion.

3. The vehicle body structure according to claim 1, wherein
the first metal includes aluminum, and
the second metal is steel.

4. The vehicle body structure according to claim 2, wherein
the first metal includes aluminum, and
the second metal is steel.

5. The vehicle body structure according to claim 1, wherein
the first vehicle body member includes a roof panel, and
the second vehicle body member includes a frame member extending in a left-right direction.

6. The vehicle body structure according to claim 2, wherein
the first vehicle body member includes a roof panel, and
the second vehicle body member includes a frame member extending in a left-right direction.

7. The vehicle body structure according to claim 3, wherein
the first vehicle body member includes a roof panel, and
the second vehicle body member includes a frame member extending in a left-right direction.

8. The vehicle body structure according to claim 4, wherein
the first vehicle body member includes a roof panel, and
the second vehicle body member includes a frame member extending in a left-right direction.

* * * * *